Inventor
William R. Purnell,

Patented Nov. 7, 1922.

1,434,406

UNITED STATES PATENT OFFICE.

WILLIAM R. PURNELL, OF THE UNITED STATES NAVY.

AIR-CONTROL REGISTER FOR FUEL BURNERS.

Application filed March 19, 1921. Serial No. 453,656.

*To all whom it may concern:*

Be it known that I, WILLIAM R. PURNELL, a lieutenant commander in the United States Navy, and a citizen of the United States, at present stationed at Philadelphia, in the county of Philadelphia and State of Pennsylvania, have invented certain new and useful Improvements in Air-Control Registers for Fuel Burners; and I do hereby declare the following to be a full, clear, and exact description of the invention, such as will enable others skilled in the art to which it appertains to make and use the same.

This invention relates to air control registers for fuel burners and has for its object to provide a device of this character which will be simple in construction and comparatively inexpensive to manufacture, and more efficient in use than those which have been heretofore proposed.

With these and other objects in view the invention consists in the novel details of construction and combinations of parts more fully hereinafter disclosed and particularly pointed out in the claims.

Referring to the accompanying drawings forming a part of this specification, in which like numerals designate like parts in all the views.

Figure 2:
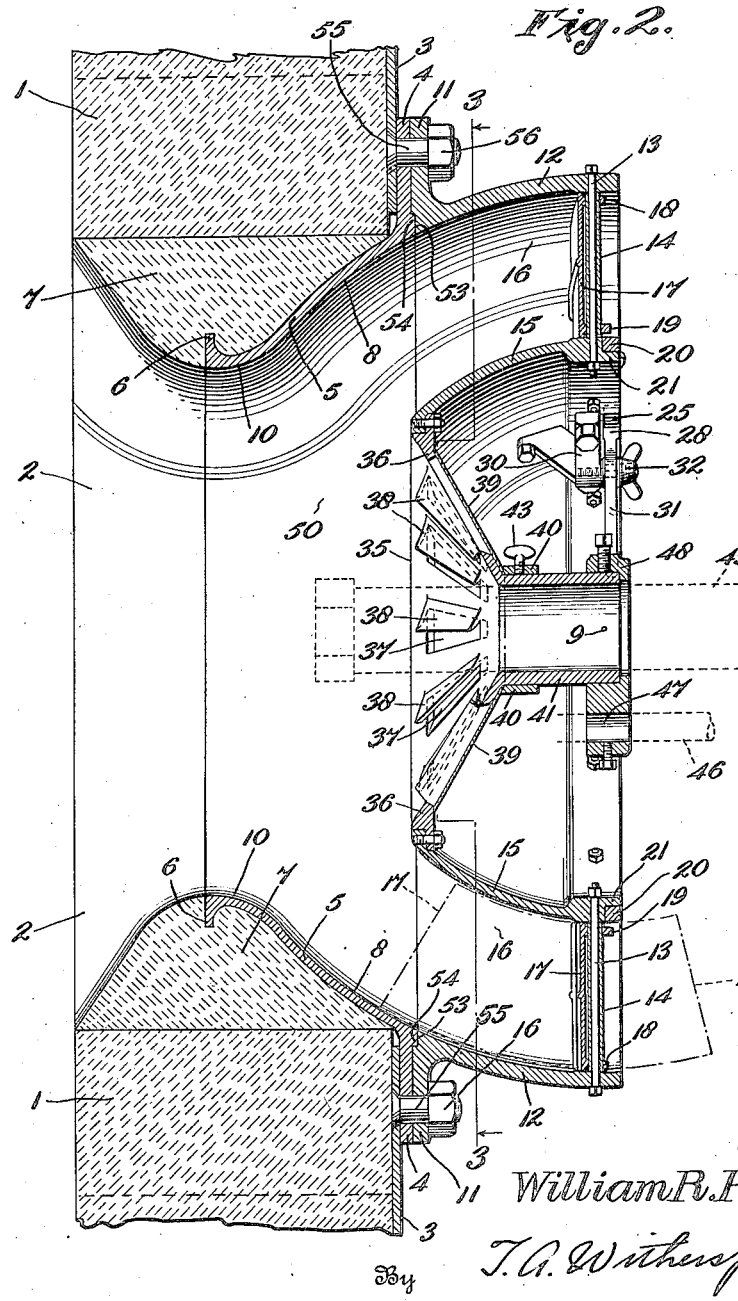
Figure 2 is a central vertical sectional view taken on the line 2—2 of Figure 1, looking in the direction of the arrows.

1 indicates the wall of any suitable furnace, provided with an opening 2, and with a front plate 3, against which fits the outer flange 4 of the furnace opening ring 5, extending into the said opening 2, and provided with a second flange 6 embedded in the refractory material 7, as shown in Figure 2. The inner surface of the said ring 5 is in the form of a reverse curve, one portion 8 of which is equidistant at all points from a center 9 lying in the axis of the fuel burner. The said ring, as it approaches its smallest diameter, is curved reversely, as at 10, to insure a smooth, even flow of the combustible mixture from the mixing chamber to the furnace, and the refractory material 7 is so formed or molded as to continue this reverse curve, as will be clear from Figure 2.

Fitting against the flange 4 of the furnace opening ring 5, is the flange 11 of the foundation ring 12, which is recessed as at 53 to accurately fit the annular rib or shoulder 54 with which the ring 5 is provided. The rings 5 and 12 may be secured to each other and to the furnace front 3 by means of the studs 55 and nuts 56 as shown, and the inner surface of the ring 12 following a curve struck from the same center 9 as the portion 8 of the ring 5, when the two rings are thus secured together they form a partially spherical bowl-like member, as will be clear from the drawings.

Secured to the foundation ring 12 by means of a plurality of bolts 13 surrounded by the sleeves or distance pieces 14 is an inner ring 15, the outer surface of which follows a curve struck from the same center 9 as was the curves of the inner surfaces of the rings 12 and 5 as above disclosed, although the radius of the curve of this last mentioned ring 15 is somewhat less than the radius of the rings 5 and 12. The assembly of the ring 15 within the ring 12 as just disclosed provides an annular passage 16 which I term the secondary air passage leading from the fire room into the furnace opening 2, which passage is, owing to the curvature of the surfaces of the rings 5, 12 and 15 partly spherical in shape. Pivotally secured to each of the bolts 13 and sleeves 14 is an arcuate vane or shutter 17 provided with a top lug 18 and bottom lug 19 forming a support for the said vanes, as will be readily apparent. These said vanes are adapted to swing about their respective pivoting means 13 and 14 under the influence of an operating ring 20 mounted upon the shoulder 21 with which the ring member 15 is provided (see Figure 2).

Figure 4:
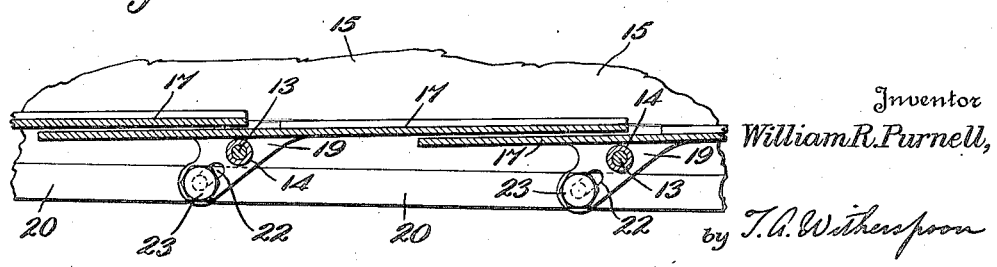
Figure 4 is a fragmentary detail sectional view on an enlarged scale, of a portion of the shutters which control the secondary air supply, taken on the line 4—4 of Figure 1, looking in the direction of the arrows.

That is to say, each of the lugs 19 carried by the vanes or shutter member 17, in addition to affording a pivot for the bottom of the said vanes, is provided with an elongated slot as at 22 to receive a connecting screw or bolt 23 secured to the said operating ring 20. The said screws or bolts 23 being offset with respect to the pivot bolts 13, as will be clear from Figure 4, it follows that any arcuate movement of the operating ring 20 will cause the vanes or shutter members 15 to pivot about their studs 13 and to swing from the closed position illustrated in full lines in Figures 1 and 2 to the broken line position indicated at the bottom of Figure 2. The swinging of these said shutter members 17 from an open to a closed position or vice versa serves to control the amount of air permitted to pass through the secondary air passage 16, as will be readily apparent.

Figure 1:
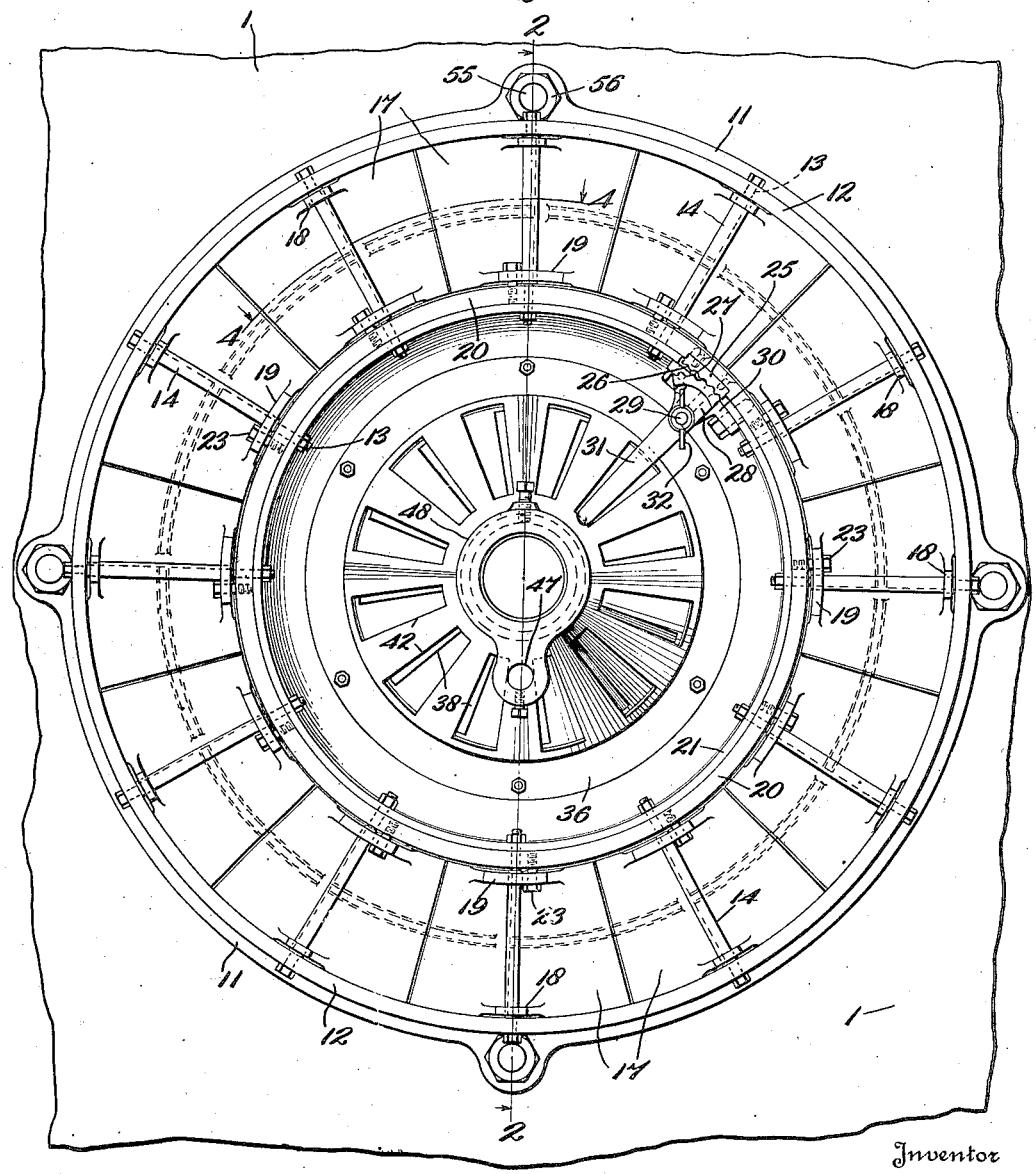
Figure 1 is a diagrammatic elevational view of a register made in accordance with the present invention, as seen from outside the furnace.

Any suitable means may be employed to cause the oscillation of the operation ring 20 and I have here shown a relatively short rack segment 25 secured to the said ring 20 provided with teeth 26 adapted to engage with the teeth 27 of a gear sector 28 pivoted as at 29 to a suitable casting 30 rigid with the ring member 15, as will be clear from Figures 1 and 2.

Figure 3:
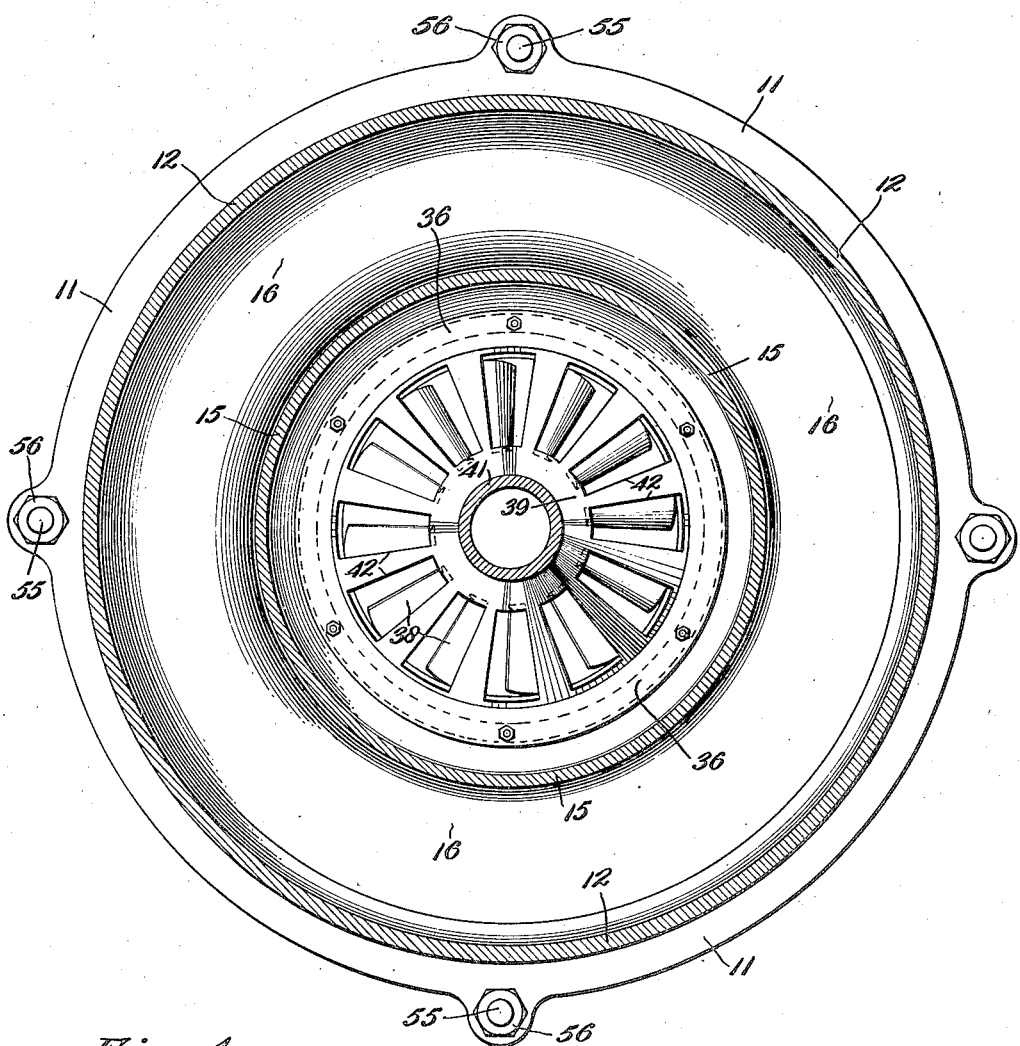
Figure 3 is a sectional elevational view, taken on the line 3—3 of Figure 2, looking in the direction of the arrows.

The said gear sector 28 is provided with an operating handle or lever 31 and is adapted to be held in any position to which it may be adjusted by means of a butterfly nut 32. Secured to the furnace side of the ring 15 is the primary air control shutter member 35 comprising a conical member 36 having a plurality of openings 37 through its sides each of which openings has associated with it the rigid deflecting vanes 38, as will be clear from Figures 2 and 3. Associated with the said conical member 36 is the movable shutter member 39 having the collar 40 adapted to be mounted upon the hollow cylindrical extension 41 of the said member 36.

The shutter member 39 is provided with openings 42 conforming substantially in shape and area to the openings 37 in the member 36 and the said shutter member 39 is adapted to be adjusted relatively to the member 36, both in an angular and in an axial direction. That is to say, the said member 39 may be rotated so that its openings 42 coincide with the openings 37 of the members 36 to permit a free flow of the air therethrough or the said member 39 may be slightly rotated in order to partially close the said openings. Again, should it be desired to permit the greatest quantity of air to pass through the openings 37 the member 39 may be moved axially toward the right as seen in Figure 2 away from the member 36, in which event it will not only facilitate the flow of air through the openings 37, but it will also tend to decrease the amount of radiant heat transmitted from the furnace to the fire room. The said member 39 may be secured in any desired position by means of the set screw 43 passing through the collar 40, as will be readily apparent.

Any suitable form of fuel burner employing either liquid, gaseous, or powdered fuel may be used with this register, and I have merely indicated diagrammatically by the dotted lines 45 a conventional burner passing through the hollow sleeve 41 of the conical member 36. This said burner may be adjustably supported by means of a rod 46 passing through the hole 47 in the supporting casting 48 rigidly secured to the sleeve 41 or in any other desired manner.

The operation of the present air control register will be clear from the foregoing, but may be briefly summarized as follows:

Supposing the parts to be in the positions illustrated in full lines in Figure 2, the primary air necessary for effecting the combustion of the fuel mixture leaving the burner 45 will pass through the openings 42 and 37 of the primary air control members 36 and 39, and will be mixed with the fuel issuing from the burner 45 in the mixing chamber 50, where it will be ignited and the flame projected into the furnace through the opening 2 in the usual manner. Should it be desired to supply additional air to the mixture this may be accomplished by oscillating the lever member 31 of the gear sector 28 which through the rack segment 25 will move the operating ring 20 through a small arc and through its connections with the lugs 19 of the secondary air control shutter 17 will cause the latter to swing upon their pivots 14 to an open or a partially open position, as shown in dotted lines at the lower part of Figure 2.

Under some conditions it may be desirable to feed the entire amount of air necessary to effect the combustion of the fuel through the secondary air passage 16, in which event the primary air openings 37 may be closed entirely by adjusting the shutter member 39 with respect thereto.

When these said openings are open and air is passing through it will impinge upon the angularly disposed vanes 38 associated with the said openings 37, which will cause a swirling motion of the air passing through the said openings, thereby effecting a very complete mixture of the air with the fuel from the burner 45 in the mixing chamber 50.

It is obvious that those skilled in the art may vary the details of construction, as well as the arrangement of parts without departing from the spirit of the invention, and therefore it is not wished to be limited to the above disclosure except as may be required by the claims.

What I claim is:

1. In an air control register for fuel burners the combination of a member provided with a plurality of openings adapted to deliver air adjacent the burner nozzle; rotatable and slidable means adapted to control the passage of air through said openings; a second member associated with said first named member in spaced relation thereto to provide an additional passage adapted to deliver air adjacent said nozzle; and pivoted means adapted to control the flow of air through said last named passage, substantially as described.

2. In an air control register for fuel burners the combination of a member provided with a plurality of openings adapted to admit air adjacent the burner nozzle; an angularly disposed vane associated with each of said openings adapted to deflect the air as it passes through the latter; rotatable and slidable means adapted to control the amount of air passing through said openings; a second member associated with said supporting member in spaced relation thereto to provide an additional passage adapted to deliver air adjacent said nozzle; pivoted means adapted to control the flow of air through said last named passage; and means adapted to operate said pivoted means, substantially as described.

3. In an air control register for fuel burners the combination of a member provided with a plurality of openings adapted to admit air adjacent the burner nozzle; an angularly disposed vane associated with each of said openings adapted to deflect the air as it passes through the latter; rotatable and slidable means adapted to control the amount of air passing through said openings; a second member associated with said supporting member in spaced relation thereto to provide an additional passage adapted to deliver air adjacent said nozzle; means comprising a plurality of pivoted shutter members adapted to control the flow of air through said last named passage; and means comprising an oscillating ring member and connections adapted to operate said pivoted shutter means, substantially as described.

4. In a device of the class described, the combination of an outer partly spherical ring-like member; an inner partly spherical ring-like member smaller than said outer member, mounted inside of, and secured in spaced relation to, said outer member to provide a curved annular air passage; means comprising pivoted vanes and an operating ring for controlling the flow of air through said passage; means associated with said inner member having openings adapted to deliver air adjacent a burner; and means for controlling the flow of air through said openings, substantially as described.

5. In a device of the class described the combination of a member adapted to surround a burner and having a plurality of openings to deliver air adjacent the burner outlet; rotatable and slidable means for controlling the passage of air through said openings; means forming an unobstructed curved annular air passage surrounding said first named member; and pivoted means for controlling the passage of air through said surrounding passage, substantially as described.

6. In a device of the class described the combination of a burner; a cone shaped member associated with said burner and provided with a plurality of openings adapted to deliver air adjacent the burner nozzle; a slidable and rotatable cone shaped member adapted to control said openings; a second member associated with said first named member in spaced relation thereto to provide an additional unobstructed passage adapted to deliver air adjacent said nozzle; means for supporting said first named member from said second named member; and means pivoted on said supporting means adapted to control the flow of air through said last named passage, substantially as described.

7. In a device of the class described the combination of an outer partly spherical ring like member adapted to be secured to a furnace wall; an inner partly spherical ring like member secured to said outer member in spaced relation thereto to provide a curved annular air passage; a plurality of arcuate pivoted shutter members associated with said ring like members and adapted to control said annular passage; a ring like shutter operating member mounted for oscillation upon said inner ring member; and means comprising a lever adapted to oscillate said operating member, substantially as described.

8. In a device of the class described the combination of an outer partly spherical ring like member adapted to be secured to a furnace wall; an inner partly spherical ring like member secured to said outer member in spaced relation thereto to provide a curved annular air passage and a mixing chamber, said inner member being also provided with a plurality of openings adapted to admit an additional quantity of air to said mixing chamber; oscillating and slidable means for controlling said openings; a plurality of arcuate pivoted shutter members associated with said ring like members and adapted to control said annular passage; a shutter operating member mounted for oscillation upon said inner ring member; and means adapted to oscillate said operating member, substantially as described.

9. In a device of the class described the combination of an outer partly spherical ring like member adapted to be secured to a furnace wall; an inner partly spherical ring like member secured to said outer member in spaced relation thereto to provide a curved annular air passage and a mixing chamber, said inner member being also provided with a plurality of openings adapted to admit an additional quantity of air to said mixing chamber; oscillating and axially movable means for controlling said openings; a rigid vane associated with each of said openings adapted to deflect air passing through the latter as it enters said mixing chamber; a plurality of arcuate pivoted shutter members associated with said ring like members and adapted to control said annular passage; a shutter operating member mountd for oscillation upon said inner ring member; and means adapted to oscillate said operating member, substantially as described.

10. In a device of the class described, in combination, a burner; inner and outer spherically curved walls surrounding the burner to form a spherical shell like air passage, said walls at their inner portions being directed toward the axis of the burner to direct the flow of air toward the flame, said outer wall forming a partially spherical mixing chamber beyond the burner; means for controlling the flow of air through said passage to said mixing chamber; and means within said inner wall provided with openings to admit air into said mixing chamber adjacent the burner.

11. In a device of the class described, in combination, a burner; inner and outer curved walls surrounding the burner to form an air passage, said walls at their inner portions being directed toward the axis of the burner to direct the flow of air toward the flame, said outer wall forming a partially spherical mixing chamber beyond the burner; means for controlling the flow of air through said passage to said mixing chamber; means within said inner wall provided with openings to admit air into said mixing chamber adjacent the burner; and means for controlling the flow of air through said openings, substantially as described.

In testimony whereof I affix my signature.

WILLIAM R. PURNELL.